United States Patent
Takenouchi

(10) Patent No.: US 12,444,052 B2
(45) Date of Patent: Oct. 14, 2025

(54) LEARNING APPARATUS, LEARNING METHOD, PROGRAM, TRAINED MODEL, AND ENDOSCOPE SYSTEM

(71) Applicant: FUJIFILM Corporation, Tokyo (JP)

(72) Inventor: Seiya Takenouchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 367 days.

(21) Appl. No.: 18/165,935

(22) Filed: Feb. 8, 2023

(65) Prior Publication Data
US 2023/0206445 A1 Jun. 29, 2023

Related U.S. Application Data

(63) Continuation of application No. PCT/JP2021/027440, filed on Jul. 26, 2021.

(30) Foreign Application Priority Data

Aug. 28, 2020 (JP) ................. 2020-144569

(51) Int. Cl.
| | |
|---|---|
| G06K 9/00 | (2022.01) |
| A61B 1/00 | (2006.01) |
| G06T 7/00 | (2017.01) |
| G06V 10/774 | (2022.01) |
| G06V 10/82 | (2022.01) |
| G16H 10/40 | (2018.01) |

(52) U.S. Cl.
CPC ...... *G06T 7/0014* (2013.01); *A61B 1/000096* (2022.02); *G06V 10/774* (2022.01);
(Continued)

(58) Field of Classification Search
CPC ......... G06T 7/0014; G06T 2207/10068; G06T 2207/20081; G06T 2207/20084;
(Continued)

(56) References Cited

U.S. PATENT DOCUMENTS 11,244,458 B2    2/2022  Ichinose et al.
2016/0364862 A1* 12/2016  Reicher ................. G06F 3/0482
(Continued)

FOREIGN PATENT DOCUMENTS

CN    109523532 A  *  3/2019  .......... G06T 7/0012
JP    2010110500      5/2010
(Continued)

OTHER PUBLICATIONS

"International Search Report (Form PCT/ISA/210) of PCT/JP2021/027440", mailed on Sep. 21, 2021, with English translation thereof, pp. 1-6.
(Continued)

*Primary Examiner* — Xin Jia
(74) *Attorney, Agent, or Firm* — JCIPRNET

(57) ABSTRACT

Provided are a learning apparatus, a learning method, a program, a trained model, and an endoscope system that perform effective learning by using accurate ground-truth data. The learning apparatus 14 is a learning apparatus 14 having a recognizer implemented by a neural network, and a processor. The processor (CPU 41) acquires a learning image 53 and biopsy information associated with the learning image 53, the learning image 53 being obtained by capturing an image of an examination object, the biopsy information being information indicating a location where a biopsy for the examination object has been performed, generates ground-truth region data in which a region including the location where the biopsy is performed is set as a ground-truth region, on the basis of the biopsy information, and trains the recognizer that recognizes a region of interest by using the learning image 53 and the ground-truth region data.

11 Claims, 16 Drawing Sheets

(52) U.S. Cl.
CPC .............. *G06V 10/82* (2022.01); *G16H 10/40*
(2018.01); *G06T 2207/10068* (2013.01); *G06T 2207/20081* (2013.01); *G06T 2207/20084* (2013.01); *G06T 2207/30096* (2013.01); *G06V 2201/03* (2022.01)

(58) Field of Classification Search
CPC ......... G06T 2207/30096; G06T 7/0012; A61B 1/000096; A61B 1/000094; A61B 1/045; G06V 10/774; G06V 10/82; G06V 2201/03; G06V 10/12; G06V 10/143; G06V 10/25; G06V 10/764; G16H 10/40; G16H 30/40; G16H 50/20
See application file for complete search history.

(56) References Cited

U.S. PATENT DOCUMENTS

2017/0309024 A1   10/2017  Kitamura et al.
2021/0052137 A1   2/2021   Miura et al.
2021/0287395 A1   9/2021   Ishikake et al.

FOREIGN PATENT DOCUMENTS

| WO | 2016117018 | 7/2016 |
| WO | 2019146356 | 8/2019 |
| WO | 2019230302 | 12/2019 |
| WO | 2020021261 | 1/2020 |
| WO | 2020110278 | 6/2020 |

OTHER PUBLICATIONS

"Written Opinion of the International Searching Authourity (Form PCT/ISA/237) of PCT/JP2021/027440", mailed on Sep. 21, 2021, with English translation thereof, pp. 1-6.

"Notice of Reasons for Refusal of Japan Counterpart Application", issued on Jun. 18, 2024, with English translation thereof, p. 1-p. 8.

* cited by examiner

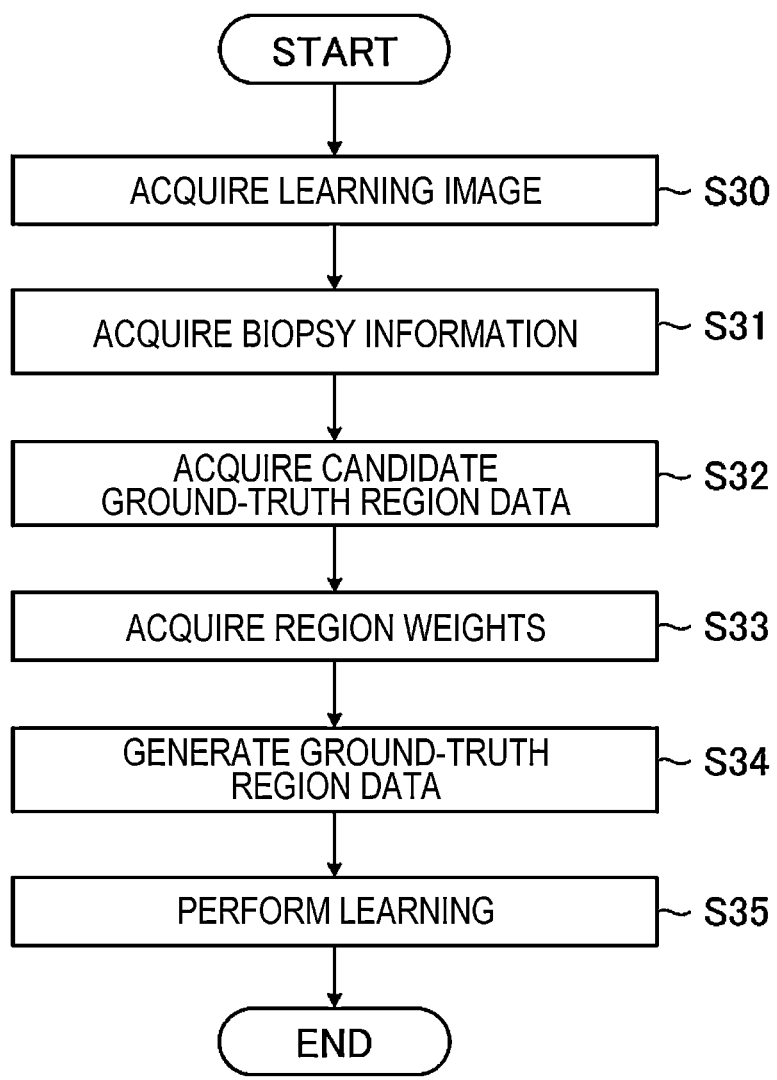

LEARNING APPARATUS, LEARNING METHOD, PROGRAM, TRAINED MODEL, AND ENDOSCOPE SYSTEM

CROSS-REFERENCE TO RELATED APPLICATIONS

The present application is a Continuation of PCT International Application No. PCT/JP2021/027440 filed on Jul. 26, 2021 claiming priority under 35 U.S.C. § 119(a) to Japanese Patent Application No. 2020-144569 filed on Aug. 28, 2020. Each of the above applications is hereby expressly incorporated by reference, in its entirety, into the present application.

BACKGROUND OF THE INVENTION

1. Field of the Invention

The present invention relates to a learning apparatus, a learning method, a program, a trained model, and an endoscope system.

2. Description of the Related Art

Support functions for medical examination or diagnosis have been proposed, such as a function of detecting a region of interest such as a lesion from a medical image that is a captured image of a portion of the body of a patient who is an examination object, and a function of identifying the degree of malignancy from the medical image. It is expected that using such support functions will prevent a lesion portion from being overlooked or reduce the burden on a doctor or the like.

Further, a recognizer using machine learning is used to implement the support functions described above. Specifically, a medical image is input to a recognizer that has performed machine learning to cause the recognizer to detect a region of interest such as a lesion or to identify the degree of malignancy of the lesion portion.

It is known that to make the recognizer perform machine learning, the accuracy of ground-truth data during learning greatly affects the accuracy of the recognizer after learning. That is, to make the recognizer perform learning, it is necessary to prepare accurate ground-truth data to obtain a high-accuracy recognizer. Accordingly, techniques for obtaining accurate ground-truth data have been proposed.

For example, in a technique described in WO2019/146356A, learning is performed using, as ground-truth data, a measurement target region corrected in response to a command from a user.

SUMMARY OF THE INVENTION

Ground-truth data for a medical image may vary in definition from user to user even when the ground-truth data is generated by a professional user such as a doctor. For example, regions of interest that are designated by a plurality of doctors for the same medical image do not necessarily match. Accordingly, the accuracy of the ground-truth data is not necessarily high. Even when a recognizer is trained on the basis of such ground-truth data, it is difficult to effectively train the recognizer.

The present invention has been made in consideration of such circumstances, and an object thereof is to provide a learning apparatus, a learning method, a program, a trained model, and an endoscope system that perform effective learning by using accurate ground-truth data.

To achieve the object described above, a learning apparatus according to an aspect of the present invention is a learning apparatus including a recognizer implemented by a neural network, and a processor. The processor is configured to acquire a learning image and biopsy information associated with the learning image, the learning image being obtained by capturing an image of an examination object, the biopsy information being information indicating a location where a biopsy for the examination object has been performed; generate ground-truth region data in which a region including the location where the biopsy has been performed is set as a ground-truth region, on the basis of the biopsy information; and train the recognizer that recognizes a region of interest, by using the learning image and the ground-truth region data.

According to this aspect, the ground-truth region data is generated such that a region including a location where a biopsy has been performed is set as a ground-truth region. Then, learning of the region of interest is performed on the basis of the ground-truth region data. Accordingly, ground-truth region data is generated such that a location where a biopsy has actually been performed is set as a region of interest for medical examination or diagnosis, and thus effective learning using accurate ground-truth region data can be performed. The accurate ground-truth region data refers to ground-truth region data clearly indicating an accurate region of interest in a learning image. The location where the biopsy has been performed is a location that the doctor actually pays attention to and determines that a further examination (biopsy) needs to be performed, and is thus accurate as a region of interest, and ground-truth region data is generated on the basis of the location where the biopsy has been performed, thereby enabling generation of accurate ground-truth region data. The region of interest is a region to which a doctor or the like should pay attention during an examination using an endoscope system. Examples of the region of interest include a location suspected of being a lesion, and a location where a typical lesion appears.

Preferably, the biopsy information is image data indicating a position where the biopsy has been performed or position data indicating the position where the biopsy has been performed.

Preferably, the processor is configured to create the ground-truth region data, in a case where the biopsy information indicates a plurality of locations where biopsies for the examination object have been performed, on the basis of at least one location among the plurality of locations where the biopsies have been performed.

Preferably, the processor is configured to create the ground-truth region data, in a case where the biopsy information indicates a plurality of locations where biopsies for the examination object have been performed, on the basis of a region including the plurality of locations where the biopsies have been performed.

Preferably, the processor is configured to acquire candidate ground-truth region data to be paired with the learning image, create the ground-truth region data on the basis of the biopsy information and the candidate ground-truth region data, and train the recognizer by using the learning image and the ground-truth region data.

Preferably, the processor is configured to calculate a region weight from a degree of matching between a region based on the biopsy information and a region based on the candidate ground-truth region data, the region weight being a weight of the region based on the candidate ground-truth region data, and train the recognizer by using the learning image, the ground-truth region data, and the region weight.

Preferably, the processor is configured to train the recognizer by using the region weight in a portion of a learning period.

Preferably, the processor is configured to train the recognizer by using the region weight in an entire learning period.

A learning method according to another aspect of the present invention is a learning method for a learning apparatus having a recognizer implemented by a neural network, and a processor. The learning method includes the steps of, by the processor, acquiring a learning image and biopsy information associated with the learning image, the learning image being obtained by capturing an image of an examination object, the biopsy information being information indicating a location where a biopsy for the examination object has been performed; generating ground-truth region data in which a region including the location where the biopsy has been performed is set as a ground-truth region, on the basis of the biopsy information; and training the recognizer that recognizes a region of interest, by using the learning image and the ground-truth region data.

A program according to another aspect of the present invention is a program for causing a learning apparatus having a recognizer implemented by a neural network, and a processor to perform a learning method. The program causing the processor to perform a learning method comprising the steps of acquiring a learning image and biopsy information associated with the learning image, the learning image being obtained by capturing an image of an examination object, the biopsy information being information indicating a location where a biopsy for the examination object has been performed; generating ground-truth region data in which a region including the location where the biopsy has been performed is set as a ground-truth region, on the basis of the biopsy information; and training the recognizer that recognizes a region of interest, by using the learning image and the ground-truth region data.

A trained model of the recognizer according to another aspect of the present invention is obtained by the learning method described above.

An endoscope system according to another aspect of the present invention is mounted with the trained model of the recognizer described above.

According to the present invention, ground-truth region data is generated such that a region including a location where a biopsy has been performed is set as a ground-truth region, and learning of a region of interest is performed on the basis of the ground-truth region data. Thus, so that ground-truth region data is generated such that a location where a biopsy has actually been performed is set as a region of interest for medical examination or diagnosis, and effective learning by using accurate ground-truth region data can be performed.

BRIEF DESCRIPTION OF THE DRAWINGS

FIG. 17 is a flow diagram illustrating a learning method.

DESCRIPTION OF THE PREFERRED EMBODIMENTS

A learning apparatus, a learning method, a program, a trained model, and an endoscope system according to the present invention will be described hereinafter with reference to the accompanying drawings.

Figure 1:
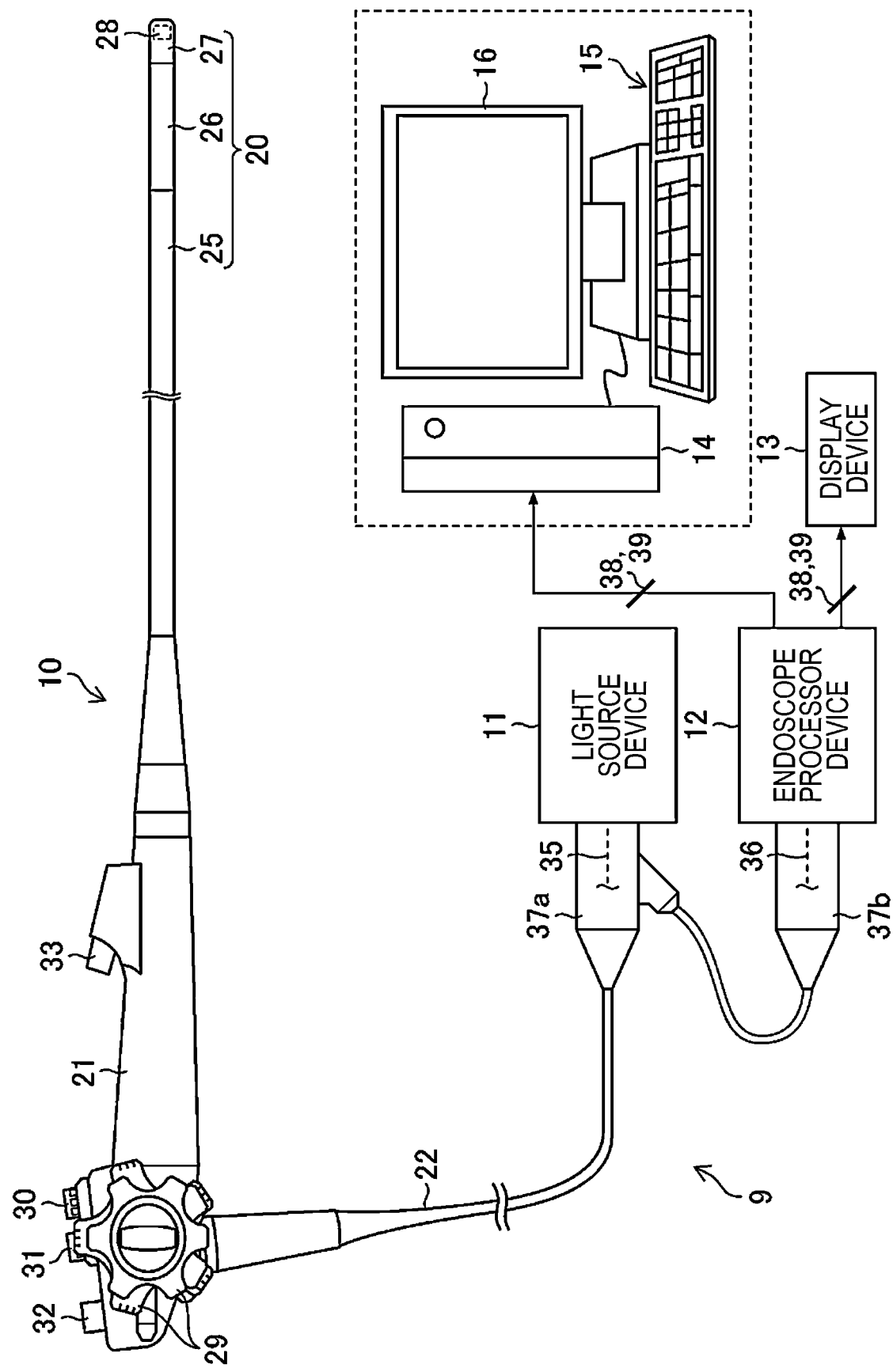
FIG. 1 is a schematic diagram illustrating an overall configuration of an endoscope system.

FIG. 1 is a schematic diagram illustrating an overall configuration of an endoscope system that acquires learning images (medical images) to be input to a learning apparatus according to the present invention.

As illustrated in FIG. 1, an endoscope system 9 includes an endoscope 10 that is an electronic endoscope, a light source device 11, an endoscope processor device 12, a display device 13, a learning apparatus 14, an operation unit 15, and a display 16.

The endoscope 10 is configured to capture time-series medical images including a photographic-subject image and is, for example, a soft endoscope. A medical image captured by the endoscope 10 is used as a learning image described below. The endoscope 10 has an insertion section 20 to be inserted into a subject and having a distal end and a proximal end, a handheld operation section 21 coupled to the proximal end side of the insertion section 20 and to be gripped by an operator to perform various operations, and a universal cord 22 coupled to the handheld operation section 21.

The insertion section 20 is formed in an elongated shape having a small diameter as a whole. The insertion section 20 is configured such that a soft part 25 having flexibility, a bending part 26 that is bendable by operation of the handheld operation section 21, and a tip part 27 in which an imaging optical system (objective lens) (not illustrated), an imaging element 28, and so on are incorporated are coupled together in order from the proximal end side to the distal end side of the insertion section 20.

The imaging element 28 is a CMOS (complementary metal oxide semiconductor) or CCD (charge coupled device) imaging element. Image light of a site being observed is incident on an imaging surface of the imaging element 28 through an observation window (not illustrated) that is opened in a tip surface of the tip part 27 and through an objective lens (not illustrated) disposed behind the observation window. The imaging element 28 performs imaging (conversion into an electric signal) of the image light of the site being observed, which is incident on the imaging surface of the imaging element 28, and outputs an imaging signal.

The handheld operation section 21 is provided with various operation members to be operated by the operator. Specifically, the handheld operation section 21 is provided with two types of bending operation knobs 29 to be used for an operation of bending the bending part 26, an air/water supply button 30 for an air/water supply operation, and a suction button 31 for a suction operation. The handheld operation section 21 is also provided with a still-image capturing instruction unit 32 for issuing an instruction to capture a still image 39 of the site being observed, and a treatment tool introduction port 33 through which a treatment tool (not illustrated) is to be inserted into a treatment tool insertion path (not illustrated) extending through the insertion section 20.

The universal cord 22 is a connection cord for connecting the endoscope 10 to the light source device 11. The universal cord 22 contains a light guide 35, a signal cable 36, and a fluid tube (not illustrated), which extend through the insertion section 20. A connector 37a to be connected to the light source device 11 and a connector 37b branching from the connector 37a and to be connected to the endoscope processor device 12 are disposed in an end portion of the universal cord 22.

The connector 37a is connected to the light source device 11, thereby inserting the light guide 35 and the fluid tube (not illustrated) into the light source device 11. Accordingly, necessary illumination light, water, and gas are supplied from the light source device 11 to the endoscope 10 through the light guide 35 and the fluid tube (not illustrated). As a result, the site being observed is irradiated with illumination light from the illumination window (not illustrated) on the tip surface of the tip part 27. In response to the operation of pressing the air/water supply button 30 described above, gas or water is ejected from an air/water supply nozzle (not illustrated) in the tip surface of the tip part 27 toward the observation window (not illustrated) on the tip surface.

The connector 37b is connected to the endoscope processor device 12, thereby electrically connecting the signal cable 36 and the endoscope processor device 12 to each other. Accordingly, an imaging signal of the site being observed (examination object) is output from the imaging element 28 of the endoscope 10 to the endoscope processor device 12 through the signal cable 36, and a control signal is output from the endoscope processor device 12 to the endoscope 10.

The light source device 11 supplies illumination light to the light guide 35 of the endoscope 10 through the connector 37a. As the illumination light, light in various wavelength ranges according to the purpose of observation, such as white light (light in the wavelength range of white or light in a plurality of wavelength ranges), light in one or a plurality of specific wavelength ranges, or a combination thereof, is selected. The specific wavelength range or ranges are narrower than the wavelength range of white.

A first example of the specific wavelength range is, for example, the blue range or the green range in the visible range. The wavelength range in the first example includes a wavelength range of 390 nm or more and 450 nm or less or a wavelength range of 530 nm or more and 550 nm or less, and light in the first example has a peak wavelength in the wavelength range of 390 nm or more and 450 nm or less or in the wavelength range of 530 nm or more and 550 nm or less.

A second example of the specific wavelength range is, for example, the red range in the visible range. The wavelength range in the second example includes a wavelength range of 585 nm or more and 615 nm or less or a wavelength range of 610 nm or more and 730 nm or less, and light in the second example has a peak wavelength in the wavelength range of 585 nm or more and 615 nm or less or in the wavelength range of 610 nm or more and 730 nm or less.

A third example of the specific wavelength range includes a wavelength range in which the absorption coefficient is different between oxyhemoglobin and reduced hemoglobin, and light in the third example has a peak wavelength in the wavelength range in which the absorption coefficient is different between oxyhemoglobin and reduced hemoglobin. The wavelength range in the third example includes a wavelength range of 400±10 nm, a wavelength range of 440±10 nm, a wavelength range of 470±10 nm, or a wavelength range of 600 nm or more and 750 nm or less, and light in the third example has a peak wavelength in the wavelength range of 400±10 nm, the wavelength range of 440±10 nm, the wavelength range of 470±10 nm, or the wavelength range of 600 nm or more and 750 nm or less described above.

A fourth example of the specific wavelength range is the wavelength range (390 nm to 470 nm) of excitation light that is used for observation (fluorescence observation) of fluorescence emitted from a fluorescent substance in a living body and that excites the fluorescent substance.

A fifth example of the specific wavelength range is the wavelength range of infrared light. The wavelength range in the fifth example includes a wavelength range of 790 nm or more and 820 nm or less or a wavelength range of 905 nm or more and 970 nm or less, and light in the fifth example has a peak wavelength in the wavelength range of 790 nm or more and 820 nm or less or in the wavelength range of 905 nm or more and 970 nm or less.

The endoscope processor device 12 controls the operation of the endoscope 10 via the connector 37b and the signal cable 36. Further, the endoscope processor device 12 generates an image (referred to also as a "moving image 38") composed of time-series frame images 38a including the photographic-subject image on the basis of an imaging signal acquired from the imaging element 28 of the endoscope 10 via the connector 37b and the signal cable 36. In addition, when the still-image capturing instruction unit 32 is operated using the handheld operation section 21 of the endoscope 10, the endoscope processor device 12 sets one frame image in the moving image 38 as a still image 39 corresponding to the timing of the imaging instruction while generating the moving image 38.

The moving image 38 and the still image 39 are medical images obtained by capturing images of the inside of the subject, that is, the inside of the living body. When the moving image 38 and the still image 39 are images obtained using light (special light) in the specific wavelength range described above, both are special-light images. Then, the endoscope processor device 12 outputs the generated moving image 38 and still image 39 to the display device 13 and the learning apparatus 14, respectively.

The endoscope processor device 12 may generate (acquire) a special-light image having information on the specific wavelength range described above on the basis of a normal-light image obtained using the white light described above. In this case, the endoscope processor device 12 functions as a special-light image acquisition unit. Then, the endoscope processor device 12 performs an arithmetic operation based on color information of red, green, and blue

[RGB (Red, Green, Blue)] or cyan, magenta, and yellow [CMY (Cyan, Magenta, Yellow)] included in the normal-light image to obtain a signal in the specific wavelength range.

Alternatively, the endoscope processor device 12 may generate a feature value image such as a known oxygen saturation image on the basis of, for example, at least one of a normal-light image obtained using the white light described above or a special-light image obtained using light (special light) in the specific wavelength range described above. In this case, the endoscope processor device 12 functions as a feature value image generation unit. The moving image 38 or the still image 39 including an in-vivo image, a normal-light image, a special-light image, and a feature value image described above is a medical image obtained by imaging or measuring a human body for the purpose of diagnosis or examination using an image.

The display device 13 is connected to the endoscope processor device 12 and functions as a display unit that displays the moving image 38 and the still image 39 input from the endoscope processor device 12. The user (doctor) performs an advancing/retracting operation or the like of the insertion section 20 while checking the moving image 38 displayed on the display device 13. If a lesion or the like is found in the site being observed, the user (doctor) operates the still-image capturing instruction unit 32 to capture a still image of the site being observed and perform diagnosis, biopsy, or the like.

The learning apparatus 14 is constituted by a computer. Further, a keyboard, a mouse, and the like to be connected to the computer in a wired or wireless manner are used as the operation unit 15, and various monitors such as a liquid crystal monitor connectable to the computer are used as the display (display unit) 16.

First Embodiment

Figure 2:
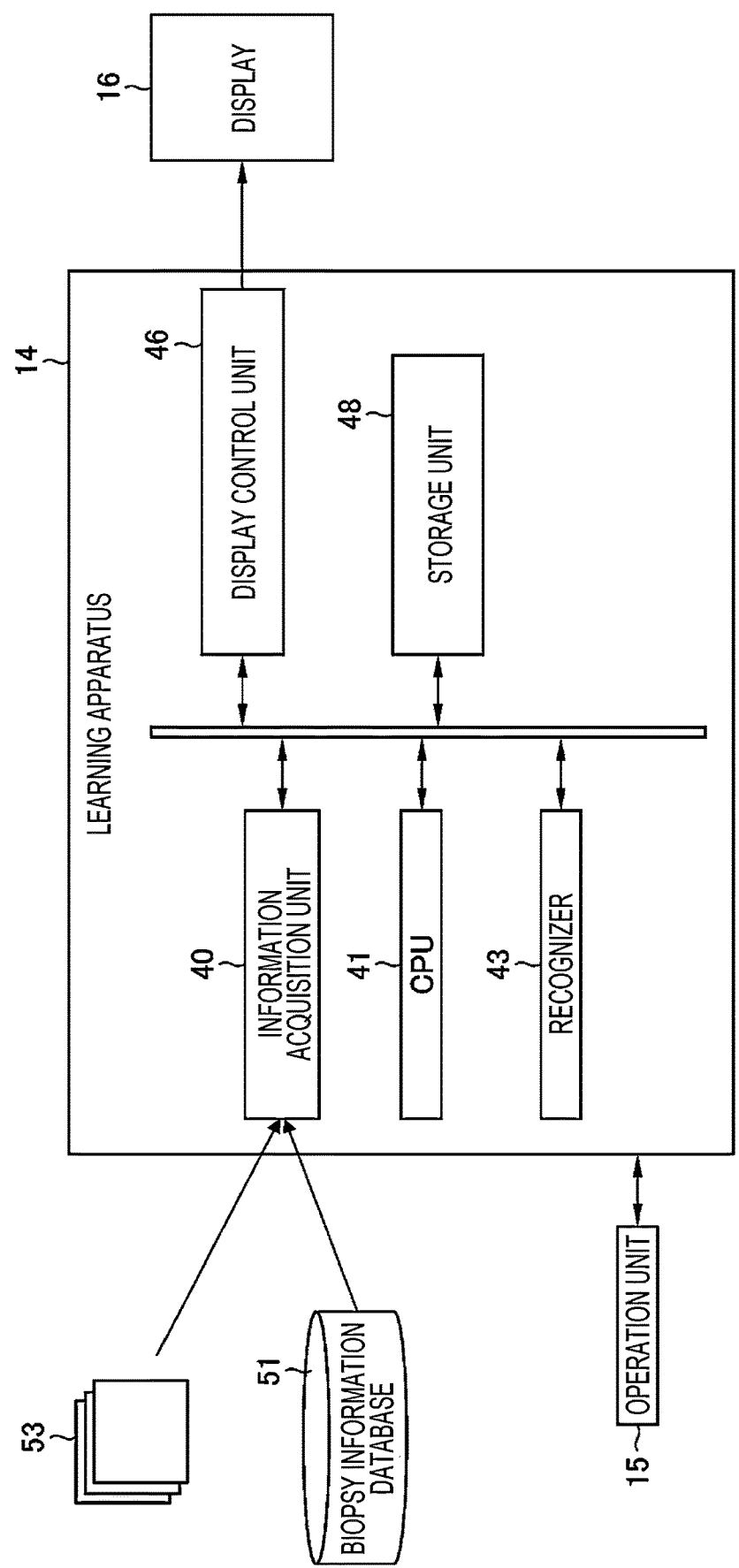
FIG. 2 is a block diagram illustrating a learning apparatus according to a first embodiment.

FIG. 2 is a block diagram illustrating the learning apparatus 14 according to a first embodiment.

The learning apparatus 14 illustrated in FIG. 2 is mainly constituted by an information acquisition unit 40, a CPU (Central Processing Unit) (processor) 41, a recognizer 43, a display control unit 46, and a storage unit 48. The display control unit 46 generates image data for display and outputs the image data to the display 16. The storage unit 48 includes a storage unit 48 serving as a work area for the CPU 41, and a storage unit 48 that stores an operating system and various programs such as a medical image processing program.

The information acquisition unit 40 acquires information used for learning of the recognizer 43. Specifically, the information acquisition unit 40 acquires a learning image 53 and biopsy information. The learning image 53 is a medical image captured by the endoscope system 9. The information acquisition unit 40 acquires the learning image 53, which is stored in a learning image database (not illustrated). The biopsy information is information associated with the learning image 53 and is information indicating a location where a biopsy for the examination object has been performed. The information acquisition unit 40 acquires the biopsy information, which is stored in a biopsy information database 51. The learning image database and the biopsy information database 51 may be disposed outside the learning apparatus 14 as illustrated in FIG. 2, or may be disposed in the learning apparatus 14.

Figure 3:
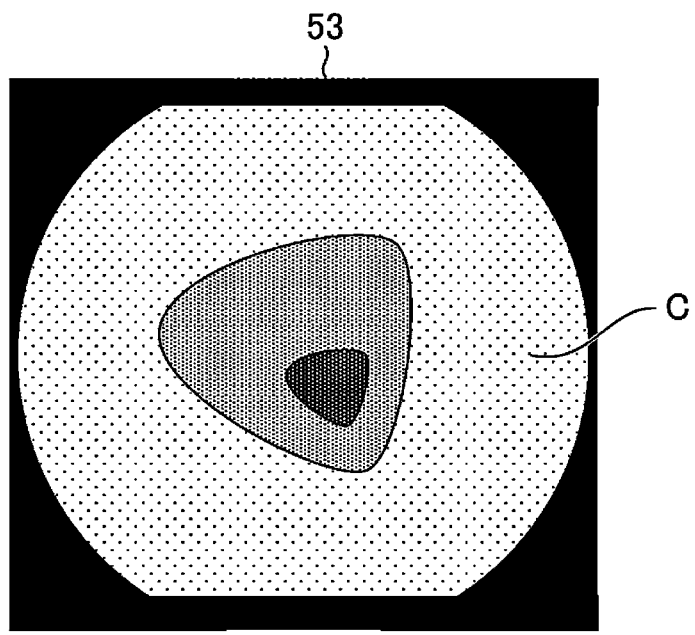
FIG. 3 is a diagram illustrating an example of a learning image.

FIG. 3 is a diagram illustrating an example of a learning image.

The learning image 53 is acquired by the endoscope system 9. For example, the learning image 53 is a medical image that is a captured image of a portion of a human body, which is an examination object. The learning image 53 is a captured image of a large intestine C into which the insertion section 20 of the endoscope 10 is inserted.

Figure 4:
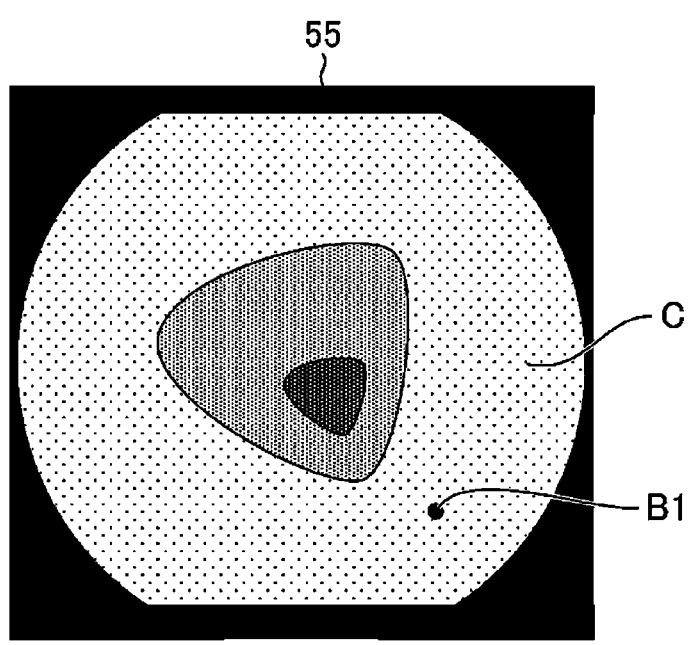
FIG. 4 is a diagram illustrating an example of biopsy information.

FIG. 4 is a diagram illustrating an example of biopsy information.

In biopsy information 55, a location B1 where a biopsy has been performed is indicated in the learning image 53. As described above, an example of the biopsy information is image data in which the location B1 indicating the position where the biopsy has been performed is added to the learning image 53. Another example of the biopsy information may be position data related to coordinates indicating the position of the location B1 where the biopsy has been performed. The coordinates indicating the position of the location B1 and the learning image 53 are associated with each other. The examples of the biopsy information described above are specific examples, and the biopsy information is not particularly limited so long as it is information indicating a location where a biopsy has been performed (for example, a location where a portion of the human body is excised with forceps or the like). The location B1 where the biopsy has been performed in the biopsy information 55 is a location where a doctor has performed a further examination (biopsy) in the actual diagnosis. Accordingly, a region including the location B1 where the biopsy has been performed is a region of interest. The region of interest is a region to which a doctor or the like should pay attention during an examination using the endoscope system 9. Examples of the region of interest include a location suspected of being a lesion, and a location where a typical lesion appears.

Referring back to FIG. 2, the CPU 41 operates in accordance with a program stored in the storage unit 48 to perform overall control of the information acquisition unit 40, the recognizer 43, and the display control unit 46, and functions as some of these units. As described in detail below, the CPU 41 controls training of the recognizer 43.

Figure 5:
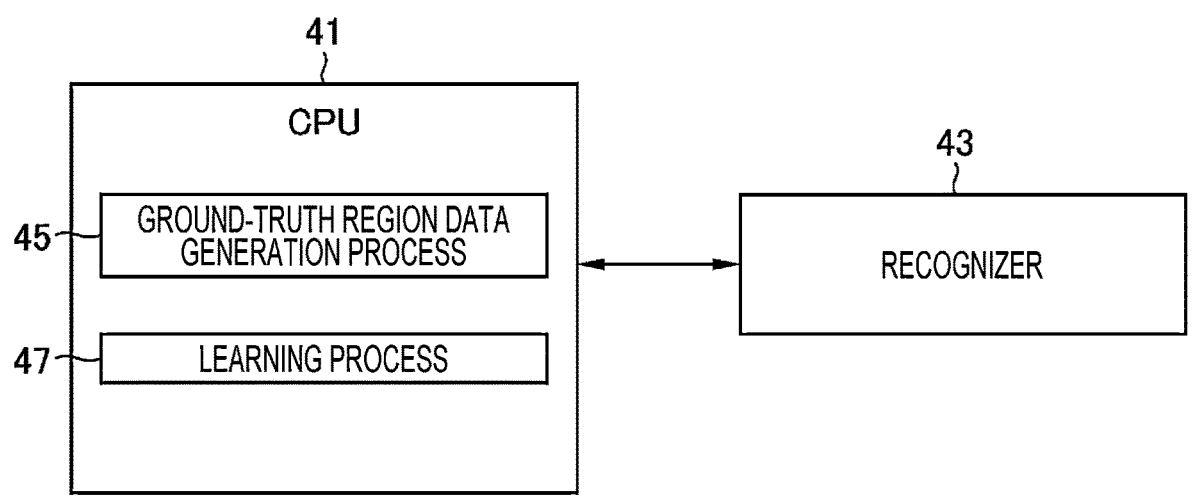
FIG. 5 is a diagram illustrating processing performed by a CPU.

FIG. 5 is a diagram illustrating processing performed by the CPU 41.

The CPU 41 performs a ground-truth region data generation process 45 and a learning process 47.

The ground-truth region data generation process 45 generates ground-truth region data in which a region including the location B1 where the biopsy has been performed is set as a ground-truth region by using the learning image 53 and the biopsy information acquired by the information acquisition unit 40.

Figure 6:
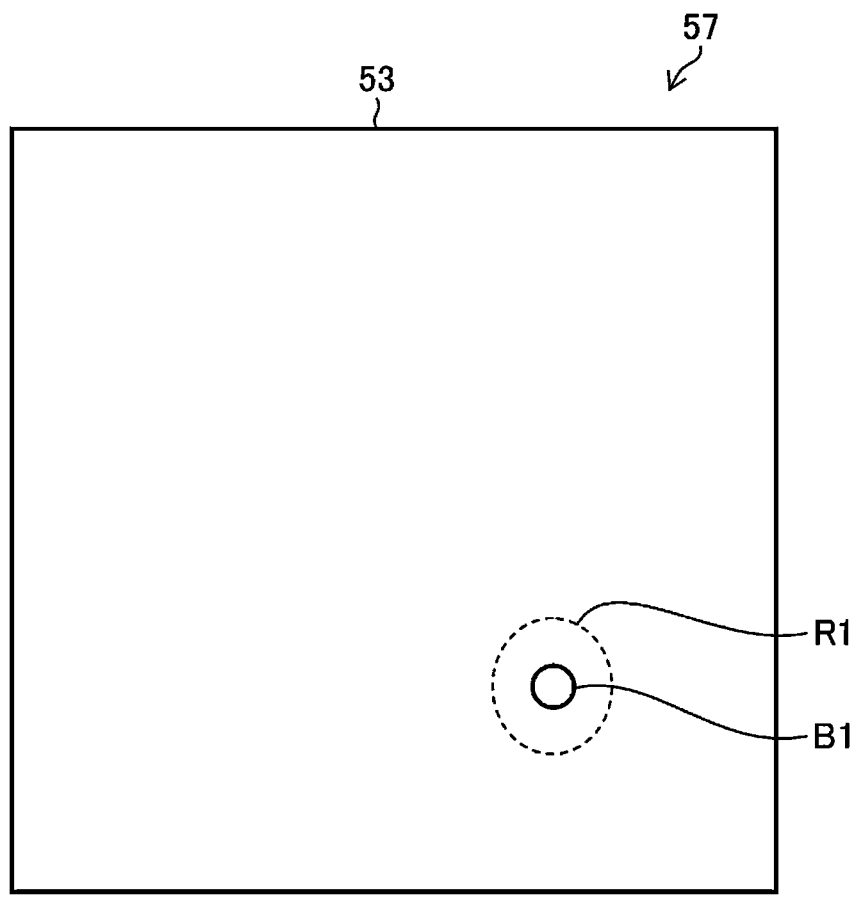
FIG. 6 is a diagram illustrating an example of ground-truth region data.

FIG. 6 is a diagram illustrating an example of the ground-truth region data.

In ground-truth region data 57 illustrated in FIG. 6, a region R1 including the location B1 where the biopsy has been performed is indicated as a ground-truth region in association with the learning image 53. A photographic subject in the learning image 53 is omitted.

The ground-truth region R1 is a region enlarged at a predetermined magnification and centered on the location B1 where the biopsy has been performed. The location B1 where the biopsy has been performed may be the location of a portion of a lesion, for example. Accordingly, to more widely observe an entire lesion or a lesion portion, a region larger than the location B1 where the biopsy has been performed needs to be set as a region of interest. Accordingly, the ground-truth region R1 is a region enlarged at a predetermined magnification and centered on the location B1 where the biopsy has been performed. The predetermined magnification is determined as appropriate in accordance with a site of the examination object or settings made by the user. If it is sufficient that the location B1 where the biopsy has been performed be set as the region of interest, the ground-truth region R1 and the location B1 where the biopsy has been performed may be equal to each other.

Referring back to FIG. 5, the CPU 41 performs the learning process 47 for the recognizer 43. Specifically, the learning process 47 of the CPU 41 trains the recognizer 43 that recognizes the region of interest by using the learning image 53 and the ground-truth region data.

Figure 7:
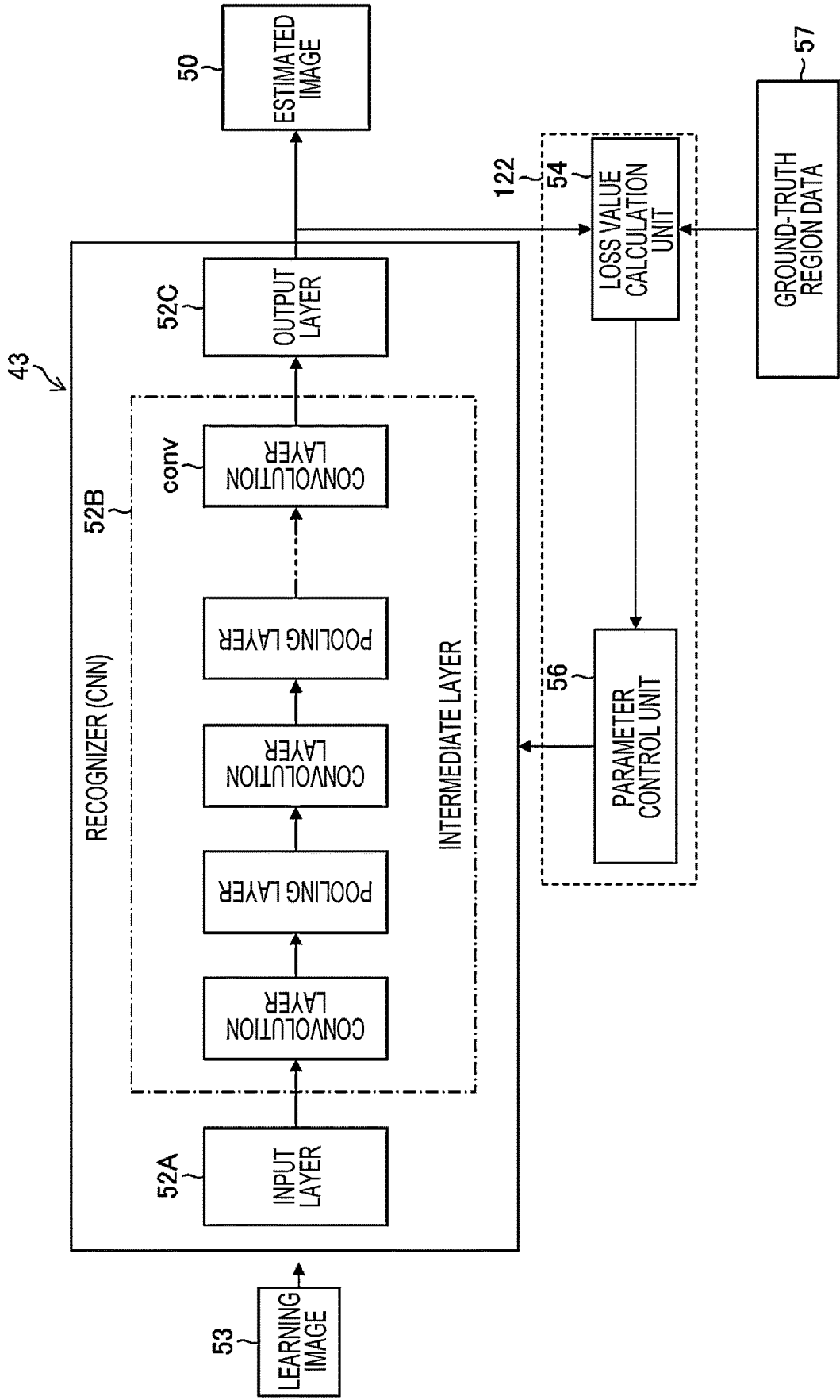
FIG. 7 is a diagram illustrating an embodiment of a recognizer.

FIG. 7 is a diagram illustrating an embodiment of the recognizer 43, which is a learning model implemented by a neural network.

The recognizer 43 receives the learning image 53 and outputs an estimated image 50 obtained by estimating the region of interest in the learning image 53. A learning processing unit 122 in which the learning process 47 is performed includes a loss value calculation unit 54 and a parameter control unit 56.

A convolutional neural network (CNN), which is one of the deep learning models, is used as the recognizer 43.

The recognizer 43 has a multiple-layer structure and holds a plurality of weight parameters. The weight parameters are updated from initial values to optimum values, thereby changing the recognizer 43 from an untrained model to a trained model. The initial values of the weight parameters of the recognizer 43 may be any values. For example, weight parameters of a trained model of an image system that performs image recognition or the like may be applied.

The recognizer 43 includes an input layer 52A, an intermediate layer 52B having a plurality of sets each including a convolution layer and a pooling layer, and an output layer 52C, and each layer has a structure in which a plurality of "nodes" are connected via "edges".

In the case illustrated in FIG. 7, the learning image 53 is input to the input layer 52A. The intermediate layer 52B is a portion that has convolution layers, pooling layers, and so on and extracts a feature from an image input from the input layer 52A. Each of the convolution layers performs filtering processing (performs a convolution operation using a filter) on a nearby node in the preceding layer to acquire a "feature map". The pooling layers reduce the feature maps output from the convolution layers to obtain new feature maps. The "convolution layer" plays a role of feature extraction such as edge extraction from an image, and the "pooling layer" plays a role of providing robustness so that the extracted features are not affected by parallel displacement or the like. In the intermediate layer 52B, convolution layers and pooling layers are not necessarily arranged alternately. The intermediate layer 52B may be configured such that convolution layers are consecutive, or may also include a normalization layer. A convolution layer cony at the final stage is a portion that outputs a feature map (image) having the same size as that of the learning image 53, which is an input image, and indicating the region of interest.

The output layer 52C is a portion that outputs a detection result of the recognizer 43 (in this embodiment, an image in which the region of interest is indicated).

The loss value calculation unit 54 acquires the detection result (the estimated image 50) output from the output layer 52C of the recognizer 43 and the ground-truth region data 57 corresponding to the input image (the learning image 53) and calculates a loss value between them. Specifically, a difference between the region of interest output in the estimated image 50 and the ground-truth region in the ground-truth region data 57 is set as a loss value. For example, a Jaccard coefficient or a Dice coefficient may be used in a method for calculating the loss value.

The parameter control unit 56 adjusts the weight parameters of the recognizer 43 on the basis of the loss value calculated by the loss value calculation unit 54 so as to minimize the distance between the estimated image 50 and the ground-truth region data 57 in the feature value space or maximize the similarity therebetween by using a back-propagation method.

The parameter adjustment processing described above is repeatedly performed, and repeated learning is performed until the loss value calculated by the loss value calculation unit 54 converges.

In this way, learning proceeds using the learning image 53 and the corresponding ground-truth region data 57 to create the recognizer 43 having a trained learning model in which the weight parameters are optimized.

Figure 8:
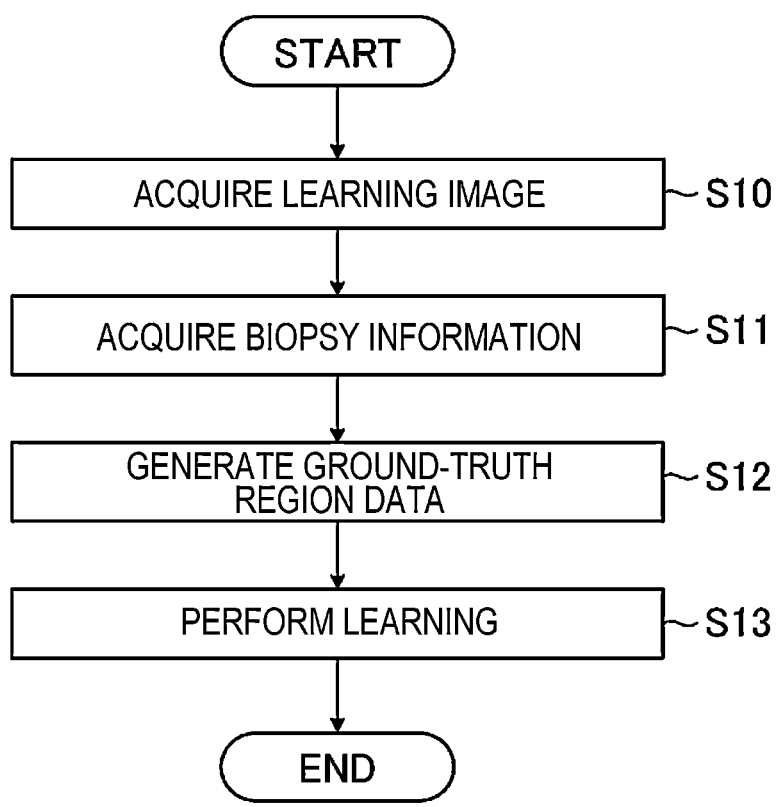
FIG. 8 is a flow diagram illustrating a learning method using the learning apparatus.

FIG. 8 is a flow diagram illustrating a learning method using the learning apparatus 14.

First, in the learning apparatus 14, the information acquisition unit 40 acquires the learning image 53 (step S10). Thereafter, in the learning apparatus 14, the information acquisition unit 40 acquires the biopsy information 55 (step S11). Then, in the learning apparatus 14, the CPU 41 performs the ground-truth region data generation process 45 to generate the ground-truth region data 57 (step S12). Thereafter, in the learning apparatus 14, the recognizer 43 receives the learning image 53 and outputs the estimated image 50 having the recognition result of the region of interest. Then, the CPU 41 performs learning so as to minimize the difference between the recognition result output from the recognizer 43 and the ground-truth region data 57 (step S13).

As described above, in this embodiment, biopsy information is used to generate the accurate ground-truth region data 57. Since the recognizer 43 is trained using the learning image 53 and the accurate ground-truth region data 57, more effective learning can be performed.

Modification Example 1 of First Embodiment

Next, modification example 1 of the first embodiment will be described. In this example, in a case where there is a plurality of locations where biopsies have been performed, ground-truth region data having a single ground-truth region is generated by the ground-truth region data generation process 45 of the CPU 41.

Figure 9:
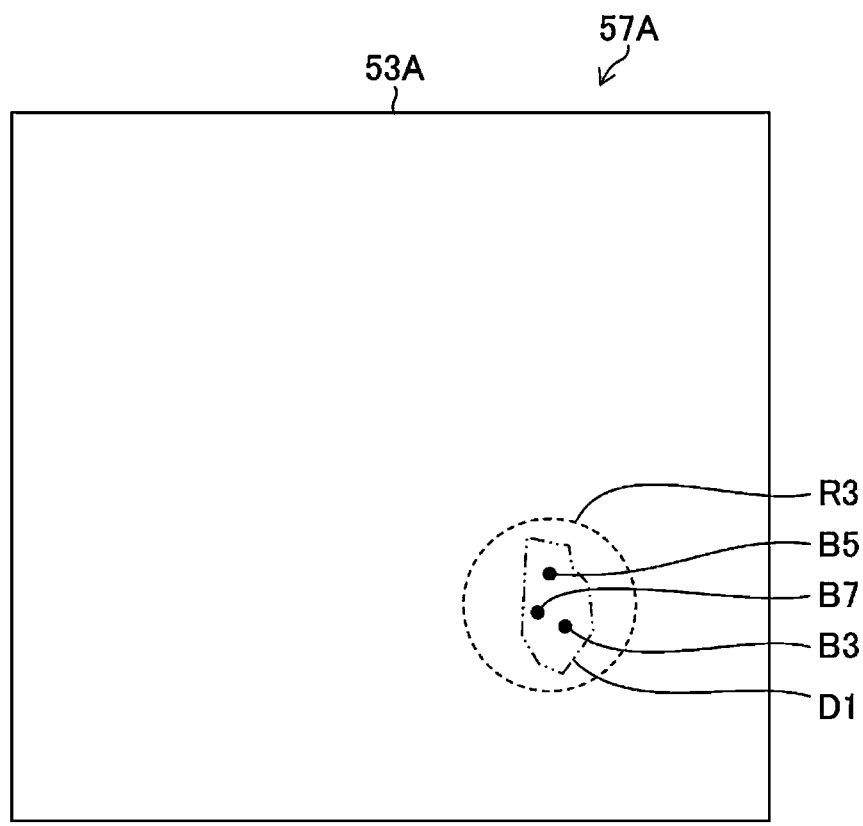
FIG. 9 is a diagram illustrating ground-truth region data.

FIG. 9 is a diagram illustrating ground-truth region data in this example.

Image data indicating the positions of three locations where biopsies have been performed or position data indicating the positions is acquired on the basis of biopsy information in this example. Specifically, as illustrated in FIG. 9, biopsies have been performed at a location B3, a location B5, and a location B7, and these biopsies have been performed on a lesion portion D1. In this case, the biopsy information also includes information indicating that the biopsies have been performed on the lesion portion D1. In the ground-truth region data generation process 45 of the CPU 41, ground-truth region data 57A indicating a ground-truth region R3 including the location B3, the location B5, and the location B7 where the biopsies have been performed is generated. The ground-truth region data 57A corresponds to a learning image 53A.

In this manner, in cases such as when biopsies are performed on the same lesion portion or when locations where biopsies have been performed are present close to each other, a ground-truth region including all the locations where the biopsies have been performed is generated. This makes it possible to generate the ground-truth region data 57A in which a peripheral portion of the locations where the biopsies have been performed is appropriately set as a region of interest, and to generate the accurate ground-truth region data 57A.

Modification Example 2 of First Embodiment

Next, modification example 2 of the first embodiment will be described. In this example, in a case where there is a plurality of locations where biopsies have been performed, ground-truth region data is generated by the ground-truth region data generation process 45 of the CPU 41 on the basis of at least one of the plurality of locations where the biopsies have been performed.

Figure 10:
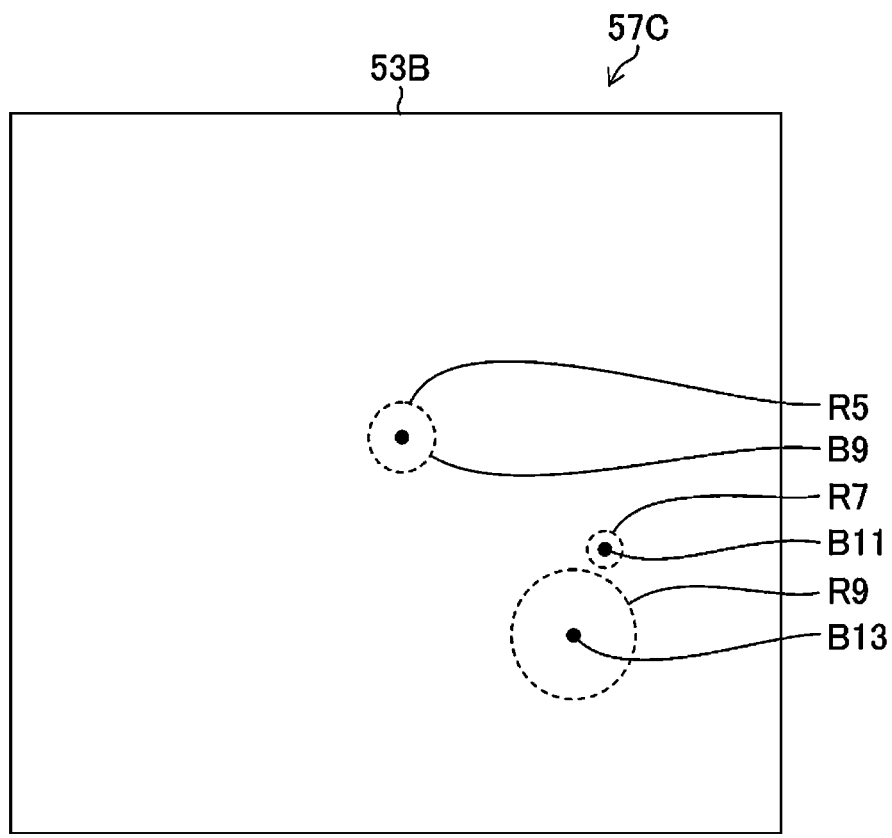
FIG. 10 is a diagram illustrating ground-truth region data.

FIG. 10 is a diagram illustrating ground-truth region data in this example.

Image data indicating the positions of three locations where biopsies have been performed or position data indicating the positions is acquired on the basis of biopsy information in this example. Specifically, as illustrated in FIG. 10, a location B9, a location B11, and a location B13 are locations where biopsies have been performed. In the ground-truth region data generation process 45 of the CPU 41, a ground-truth region is set for each of the location B9, the location B11, and the location B13 where the biopsies have been performed. Specifically, a ground-truth region R5 is generated for the location B9, a ground-truth region R7 is generated for the location B11, and a ground-truth region R9 is generated for the location B13. In this manner, even when biopsies have been performed at a plurality of locations and the locations are scattered or the biopsies are not for the same lesion portion, a ground-truth region is set for each of the locations. This makes it possible to generate ground-truth region data 57C in which peripheral portions of the locations where the biopsies have been performed are appropriately set as regions of interest, and to generate accurate ground-truth region data 57C. The ground-truth region data 57C is generated so as to correspond to a learning image 53B. In the example described above, ground-truth regions are set for all of the locations where the biopsies have been performed. In a case where there is a plurality of locations where biopsies have been performed, ground-truth region data is generated on the basis of at least one of the plurality of locations.

Second Embodiment

Next, a second embodiment will be described. In this embodiment, candidate ground-truth region data is acquired in addition to biopsy information to generate ground-truth region data.

Figure 11:
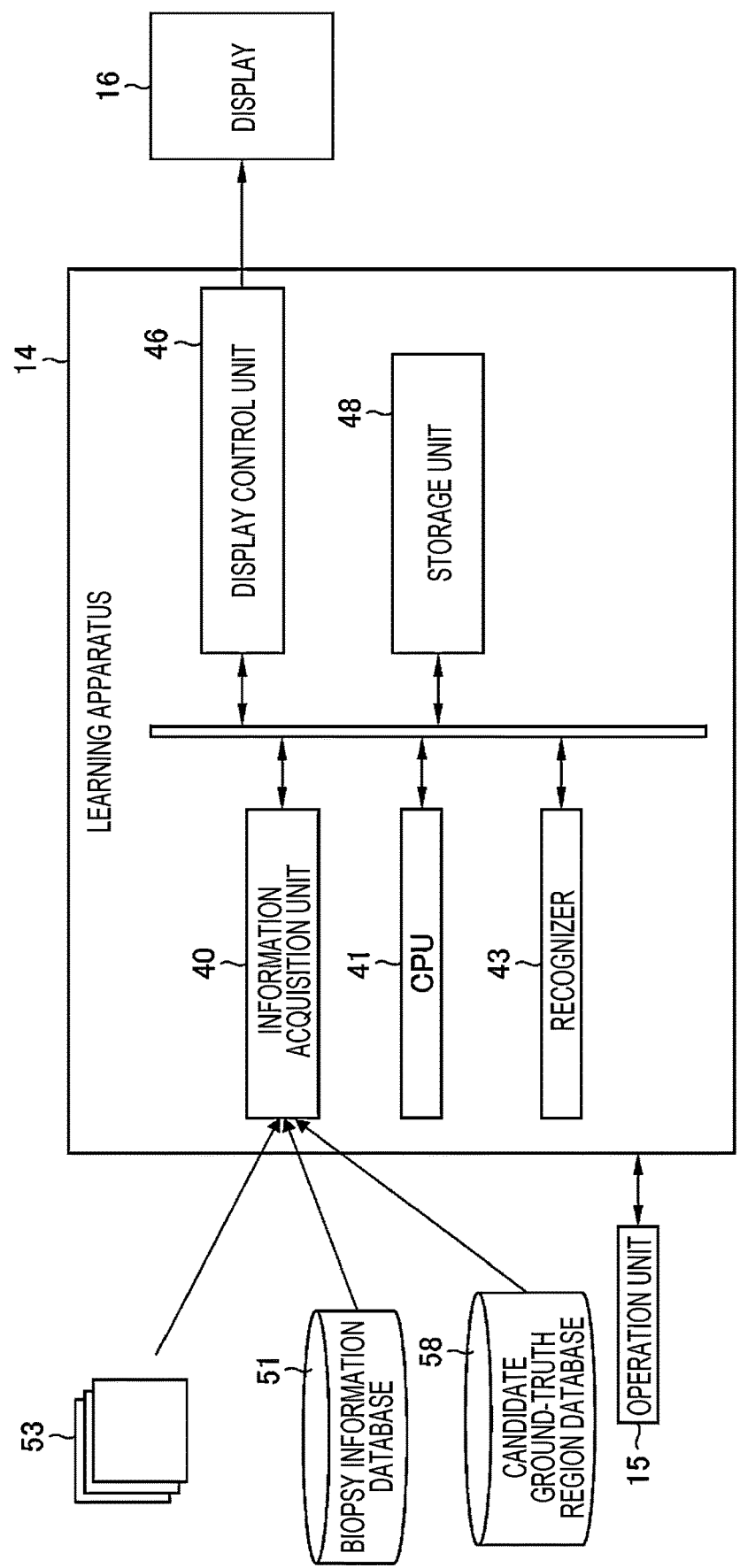
FIG. 11 is a block diagram illustrating the learning apparatus.

FIG. 11 is a block diagram illustrating a learning apparatus 14 according to the second embodiment. Components described with reference to FIG. 2 are denoted by the same reference numerals, and descriptions thereof will be omitted.

The learning apparatus 14 illustrated in FIG. 11 is mainly constituted by an information acquisition unit 40, a CPU 41, a recognizer 43, a display control unit 46, and a storage unit 48.

The information acquisition unit 40 acquires a learning image 53, biopsy information, and candidate ground-truth region data. The information acquisition unit 40 acquires candidate ground-truth region data from a candidate ground-truth region database 58. The candidate ground-truth region database 58 stores candidate ground-truth region data. The candidate ground-truth region database 58 may be disposed outside the learning apparatus 14 as illustrated in FIG. 11, or may be disposed in the learning apparatus 14.

Figure 12:
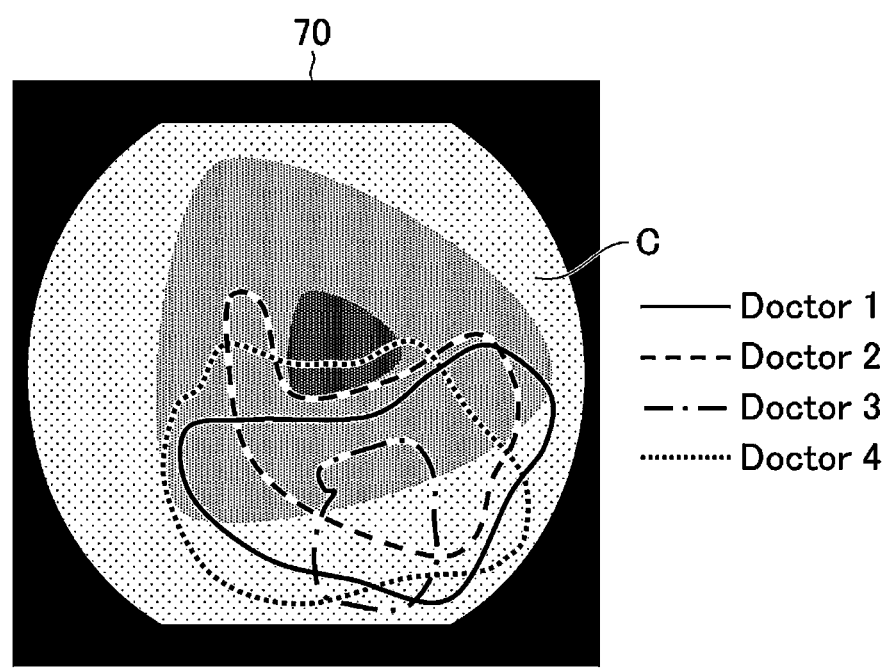
FIG. 12 is a diagram illustrating an example of candidate ground-truth region data.

FIG. 12 is a diagram illustrating an example of the candidate ground-truth region data.

In candidate ground-truth region data 70, doctors 1 to 4 indicate their regions of interest in a learning image that is a captured image of a large intestine C. The regions of interest indicated by the doctors 1 to 4 are indicated by different line types. The region indicated by the doctor 1 is a region surrounded by a solid line, the region indicated by the doctor 2 is a region surrounded by a broken line, the region indicated by the doctor 3 is a region surrounded by a dot-and-dash line, and the region indicated by the doctor 4 is a region surrounded by a finer broken line. The regions indicated by the doctors 1 to 4 include overlapping regions and non-overlapping regions. In this manner, when a plurality of doctors designate regions of interest on the basis of the same medical image (learning image), the regions of interest designated by the respective doctors vary. As described above, even if the recognizer 43 is trained using only the candidate ground-truth region data 70 having variation as ground-truth region data, the ground-truth region data is not accurate, and it is thus difficult to perform effective learning. Accordingly, in this embodiment, accurate ground-truth region data is generated on the basis of the candidate ground-truth region data 70 and the biopsy information to implement effective learning.

Figure 13:
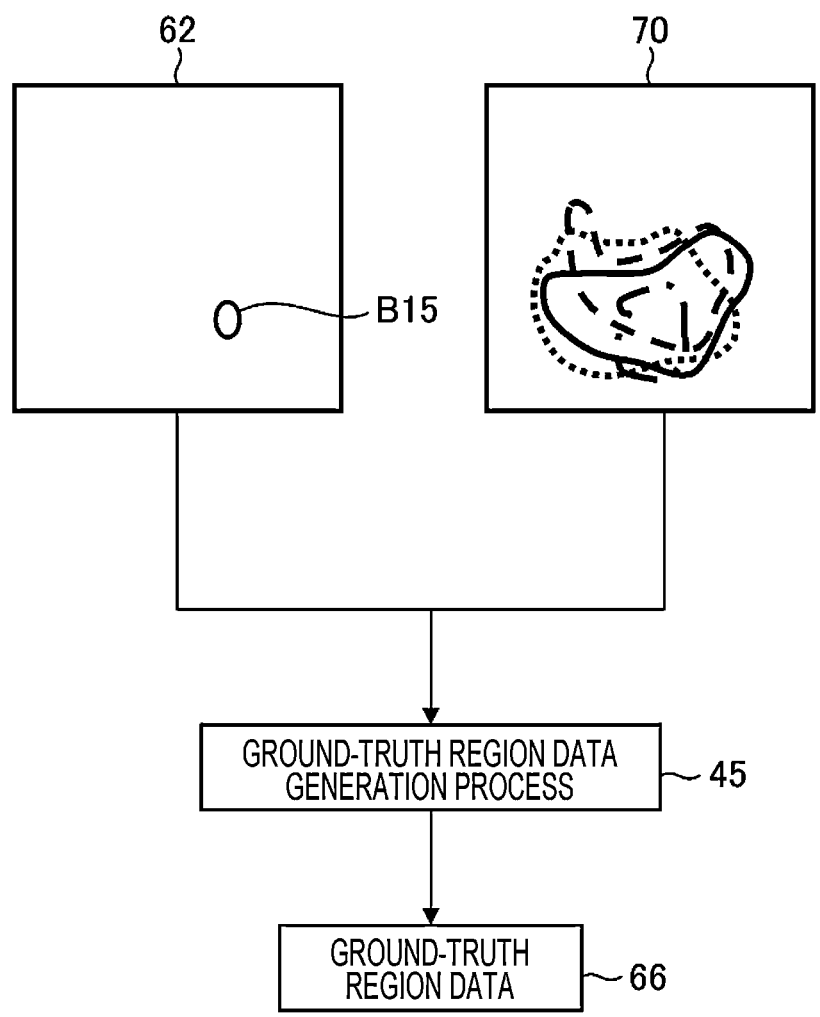
FIG. 13 is a diagram illustrating generation of ground-truth region data.

FIG. 13 is a diagram illustrating generation of ground-truth region data.

The CPU 41 performs the ground-truth region data generation process 45 on the basis of biopsy information 62 and the candidate ground-truth region data 70 to generate ground-truth region data 66. The ground-truth region data generation process 45 generates ground-truth region data by using various methods. In one example, ground-truth region data is generated in which a region obtained by enlarging a location B15 where a biopsy has been performed, which is indicated by the biopsy information 62, on the basis of the candidate ground-truth region data 70 is set as a ground-truth region. In another example, a region where the location B15 where the biopsy has been performed, which is indicated by the biopsy information 62, and all the regions indicated by the candidate ground-truth region data 70 overlap may be set as the ground-truth region data.

Figure 14:
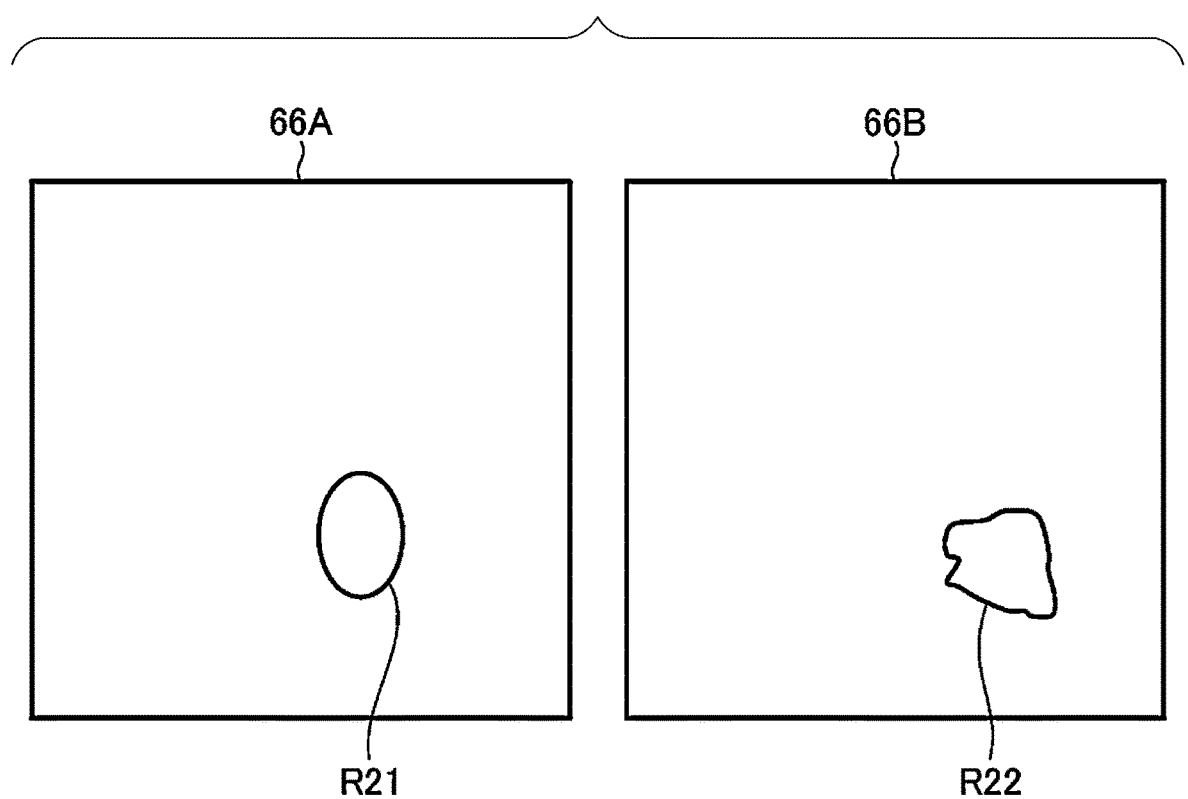
FIG. 14 is a diagram illustrating an example of the ground-truth region data.

FIG. 14 is a diagram illustrating an example of the ground-truth region data.

Ground-truth region data 66A indicates a ground-truth region R21, which is obtained by enlarging the location B15 where the biopsy has been performed in the biopsy information 62 on the basis of the candidate ground-truth region data 70. The ground-truth region R21 is a region enlarged on the basis of the candidate ground-truth region data 70 and centered on the location B15 where the biopsy has been performed. The ground-truth region data 66A having the ground-truth region R21 is accurate, and learning is performed by using the ground-truth region data 66A to achieve more effective learning.

Ground-truth region data 66B has a ground-truth region R22 where the location B15 where the biopsy has been performed in the biopsy information 62 and all of the regions in the candidate ground-truth region data 70 overlap. The ground-truth region data 66B having the ground-truth region R22 is accurate, and learning is performed by using the ground-truth region data 66B to achieve more effective learning.

Figure 15:
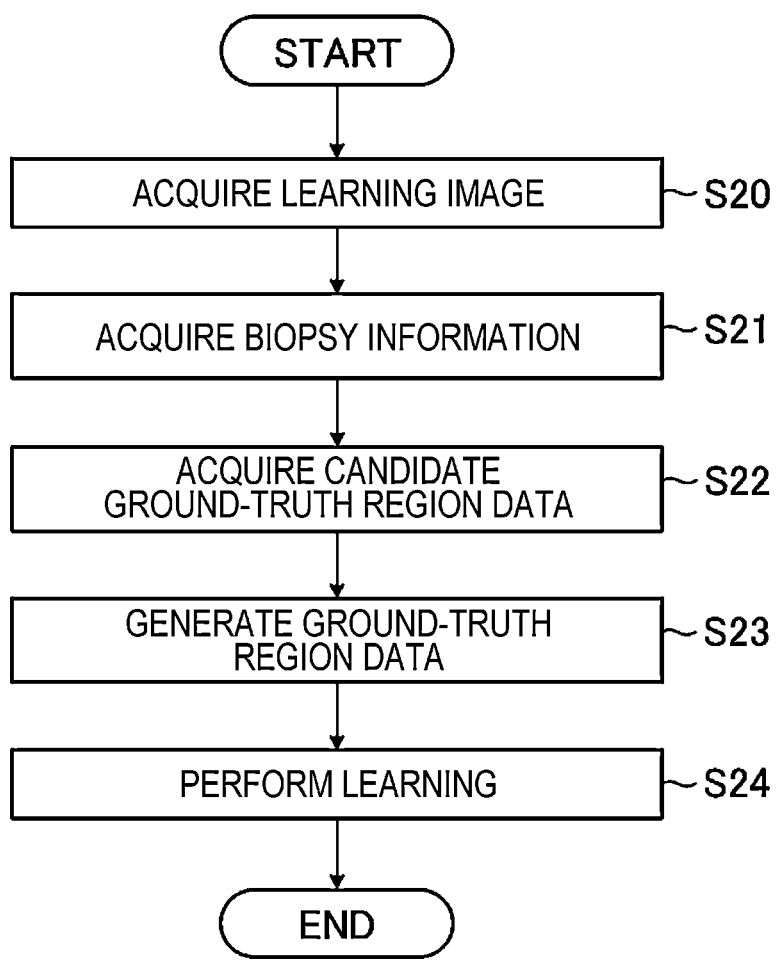
FIG. 15 is a flow diagram illustrating a learning method.

FIG. 15 is a flow diagram illustrating a learning method using the learning apparatus 14 of this embodiment.

First, in the learning apparatus 14, the information acquisition unit 40 acquires the learning image 53 (step S20). Thereafter, in the learning apparatus 14, the information acquisition unit 40 acquires the biopsy information 62 (step S21). Then, in the learning apparatus 14, the information acquisition unit 40 acquires the candidate ground-truth region data 70 (step S22). Thereafter, in the learning apparatus 14, the CPU 41 performs the ground-truth region data generation process 45 to generate the ground-truth region data 66 (step S23). Then, in the learning apparatus 14, the recognizer 43 receives the learning image 53 and outputs the recognition result of the region of interest. Then, the CPU 41 advances learning so as to minimize the difference between the recognition result output from the recognizer 43 and the ground-truth region data 66 (step S24).

As described above, according to this embodiment, the ground-truth region data 66 is generated on the basis of the biopsy information 62 and the candidate ground-truth region data 70. Then, the learning apparatus 14 of this embodiment performs learning by using the generated ground-truth region data 66 and the learning image 53. Thus, effective learning can be performed.

Modification Example 1 of Second Embodiment

Next, modification example 1 of the second embodiment will be described. In this example, a region weight, which is a weight of a region based on the candidate ground-truth region data, is calculated by the ground-truth region data generation process 45 of the CPU 41 from the degree of matching between a location where a biopsy based on biopsy information has been performed and the region based on the candidate ground-truth region data. In the learning process 47 of the CPU 41, the recognizer 43 is trained using the learning image, the ground-truth region data, and the region weight.

Figure 16:
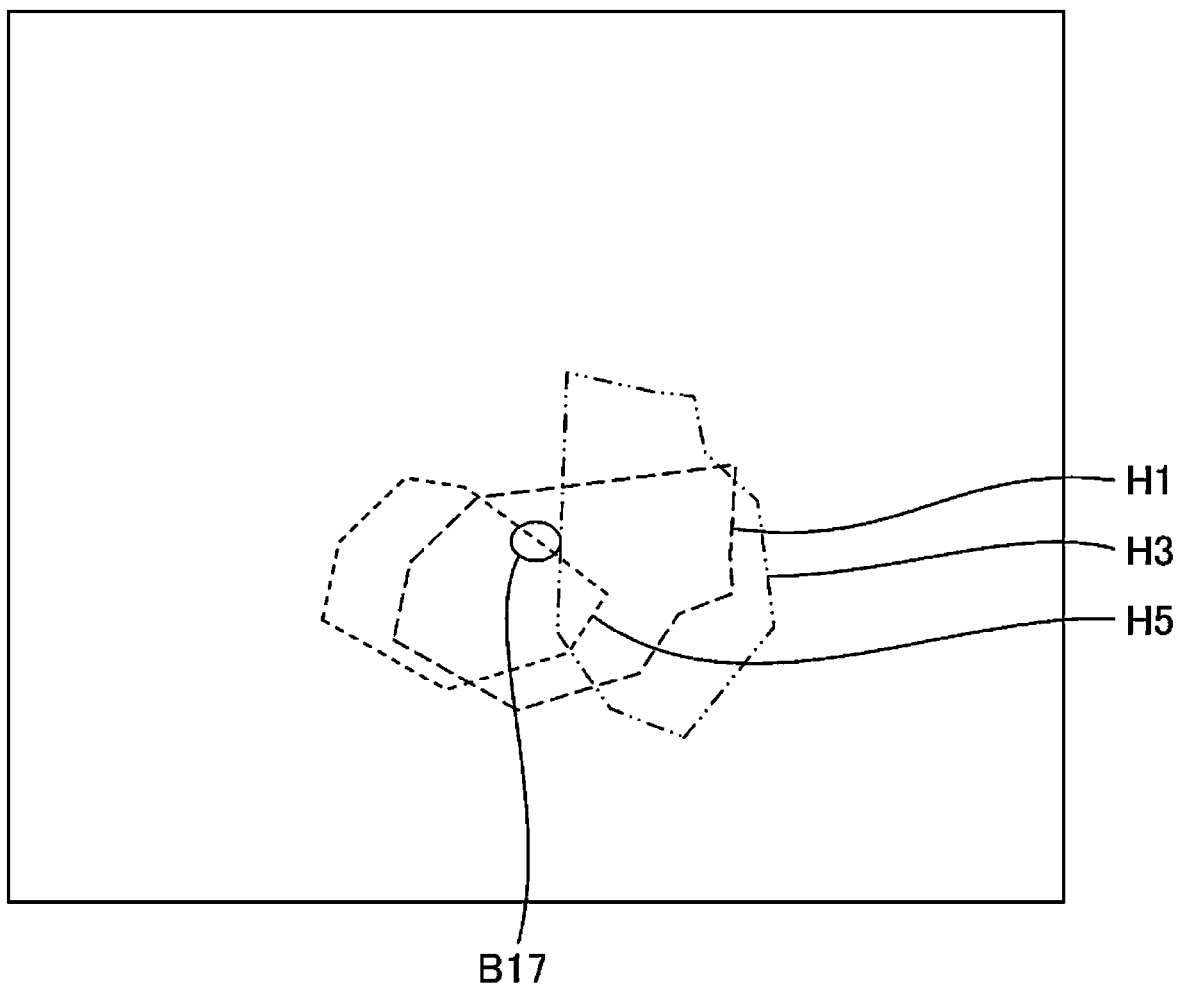
FIG. 16 is a diagram illustrating assignment of region weights to candidate regions based on candidate ground-truth region data.

FIG. 16 is a diagram illustrating assignment of region weights to candidate regions based on candidate ground-truth region data.

In the example illustrated in FIG. 16, a location B17 where a biopsy based on the biopsy information has been performed is illustrated. Further, a candidate region H1, a candidate region H3, and a candidate region H5 based on the candidate ground-truth region data are also illustrated. The candidate region H1, the candidate region H3, and the candidate region H5 are regions obtained by different doctors indicating regions of interest in the same learning image.

In the ground-truth region data generation process 45 of the CPU 41, a region weight is assigned in accordance with the size of a portion that overlaps the location B17 where the biopsy has been performed. In the case illustrated in FIG. 16, the location B17 overlaps the candidate region H1 such that the location B17 is included in the candidate region H1. Thus, the region weight of the candidate region H1 is set to a, which is the heaviest. Since the location B17 overlaps the candidate region H5 by half, the region weight of the candidate region H5 is set to b. Since the location B17 does not overlap the candidate region H3, the region weight of the candidate region H3 is set to c, which is the lightest. The weights of the region weights satisfy a>b>c. The location B17 where the biopsy has actually been performed is valued at being set as a region of interest, and a candidate region having an overlapping region with the location B17 where the biopsy has been performed is also estimated to be valued at being set as a region of interest. Accordingly, the region weights a, b, and c are assigned to the respective candidate regions in the manner described above. In this example, as described above, region weights are set, and ground-truth region data is generated using the region weights. The generation of ground-truth region data using region weights can be performed by using various methods. For example, the candidate region H1, the candidate region H3, and the candidate region H5 may be enlarged in accordance with the region weights, and a region where the enlarged candidate region H1, the enlarged candidate region H3, and the enlarged candidate region H5 overlap may be set as a ground-truth region.

FIG. 17 is a flow diagram illustrating a learning method using the learning apparatus 14 of this example.

First, in the learning apparatus 14, the information acquisition unit 40 acquires a learning image (step S30). Thereafter, in the learning apparatus 14, the information acquisition unit 40 acquires biopsy information (step S31). Then, in the learning apparatus 14, the information acquisition unit 40 acquires candidate ground-truth region data (step S32). Then, in the learning apparatus 14, the CPU 41 performs the ground-truth region data generation process 45 to acquire the weight of each region in the candidate ground-truth region data (step S33). Thereafter, in the learning apparatus 14, the CPU 41 performs the ground-truth region data generation process 45 to generate ground-truth region data (step S34). Then, in the learning apparatus 14, the recognizer 43 receives the learning image and outputs the recognition result of the region of interest. Then, the CPU 41 advances learning so as to minimize the difference between the recognition result output from the recognizer 43 and the ground-truth region data (step S35). The learning using region weights, which is performed in the CPU 41, may be performed in the entire learning period or may be performed in a portion of the learning period.

As described above, in this example, a region weight is assigned to each candidate region in candidate ground-truth region data on the basis of a location where a biopsy has been performed, and ground-truth region data is generated on the basis of the region weights. As a result, accurate ground-truth region data can be generated.

Others

In the embodiments described above, the endoscope processor device 12 and the learning apparatus 14 are separately disposed. Alternatively, the endoscope processor device 12 and the learning apparatus 14 may be integrated. That is, the endoscope processor device 12 may be provided with a function as the learning apparatus 14.

The hardware structure for performing various kinds of control of the learning apparatus 14 according to the embodiments described above including a recognizer is implemented as various processors as described below. The various processors include a CPU (Central Processing Unit), which is a general-purpose processor executing software (program) to function as various control units, a programmable logic device (PLD) such as an FPGA (Field Programmable Gate Array), which is a processor whose circuit configuration is changeable after manufacture, a dedicated electric circuit, which is a processor having a circuit configuration specifically designed to execute specific processing, such as an ASIC (Application Specific Integrated Circuit), and so on.

A single processing unit may be configured by one of the various processors or by a combination of two or more processors of the same type or different types (for example, a plurality of FPGAs or a combination of a CPU and an FPGA). Alternatively, a plurality of control units may be configured by a single processor. Examples of configuring a plurality of control units by a single processor include, first, a form in which, as typified by a computer such as a client or server computer, the single processor is configured by a combination of one or more CPUs and software and the processor functions as the plurality of control units. The examples include, second, a form in which, as typified by a system on chip (SoC) or the like, a processor is used in which the functions of the entire system including the plurality of control units are implemented by a single IC (Integrated Circuit) chip. As described above, the various control units are configured using one or more of the various processors described above as a hardware structure.

The configurations and functions described above can be each implemented by any hardware, software, or a combination of both, as appropriate. For example, the present invention is also applicable to a program that causes a computer to execute the processing steps (processing procedure) described above, a computer-readable recording medium (non-transitory recording medium) storing the program, or a computer into which the program is installable.

In the embodiments described above, furthermore, time-series images or still images captured by the endoscope 10 are medical images to be processed. However, this is not limited thereto. For example, medical images captured by an ultrasound diagnostic apparatus, an X-ray imaging apparatus, a mammography examination, or the like may be used.

It goes without saying that while examples of the present invention have been described, the present invention is not limited to the embodiments described above, and various modifications may be made without departing from the gist of the present invention.

REFERENCE SIGNS LIST 9 endoscope system
10 endoscope
11 light source device
12 endoscope processor device
13 display device
14 learning apparatus
15 operation unit
16 display
20 insertion section
21 handheld operation section
22 universal cord
25 soft part
26 bending part
27 tip part
28 imaging element
29 bending operation knob
30 air/water supply button
31 suction button
32 still-image capturing instruction unit
33 treatment tool introduction port
35 light guide
36 signal cable
37a connector
37b connector
38 moving image
38a frame image
39 still image
40 information acquisition unit
41 CPU
43 recognizer
46 display control unit
48 storage unit
50 estimated image
51 biopsy information database
52A input layer
52B intermediate layer
52C output layer
53 learning image
54 loss value calculation unit
55 biopsy information
56 parameter control unit
58 candidate ground-truth region database

What is claimed is:

1. A learning apparatus comprising:
a recognizer implemented by a neural network; and
a processor,
the processor being configured to:
acquire a learning image and biopsy information associated with the learning image, the learning image being obtained by capturing an image of an examination object, the biopsy information being information indicating a location where a biopsy for the examination object has been performed;
generate ground-truth region data in which a region including the location where the biopsy has been performed is set as a ground-truth region, on the basis of the biopsy information, wherein generate the ground-truth region data comprising:
generate the ground-truth region data by pairing a biopsy information image which includes the location of the biopsy with a candidate ground-truth region data image; and
train the recognizer that recognizes a region of interest, by using the learning image and the ground-truth region data.

2. The learning apparatus according to claim 1, wherein the biopsy information is image data indicating a position where the biopsy has been performed or position data indicating the position where the biopsy has been performed.

3. The learning apparatus according to claim 1, wherein the processor is configured to create the ground-truth region data, in a case where the biopsy information indicates a plurality of locations where biopsies for the examination object have been performed, on the basis of at least one location among the plurality of locations where the biopsies have been performed.

4. The learning apparatus according to claim 1, wherein the processor is configured to create the ground-truth region data, in a case where the biopsy information indicates a plurality of locations where biopsies for the examination object have been performed, on the basis of a region including the plurality of locations where the biopsies have been performed.

5. The learning apparatus according to claim 1, wherein the processor is configured to calculate a region weight from a degree of matching between a region based on the biopsy information and a region based on the candidate ground-truth region data, the region weight being a weight of the region based on the candidate ground-truth region data, and train the recognizer by using the learning image, the ground-truth region data, and the region weight.

6. The learning apparatus according to claim 5, wherein the processor is configured to train the recognizer by using the region weight in a portion of a learning period.

7. The learning apparatus according to claim 5, wherein the processor is configured to train the recognizer by using the region weight in an entire learning period.

8. A learning method for a learning apparatus having a recognizer implemented by a neural network, and a processor, the learning method comprising the steps of, by the processor:

acquiring a learning image and biopsy information associated with the learning image, the learning image being obtained by capturing an image of an examination object, the biopsy information being information indicating a location where a biopsy for the examination object has been performed;

generating ground-truth region data in which a region including the location where the biopsy has been performed is set as a ground-truth region, on the basis of the biopsy information, wherein generating the ground-truth region data comprising:

generating the ground-truth region data by pairing a biopsy information image which includes the location of the biopsy with a candidate ground-truth region data image; and training the recognizer that recognizes a region of interest, by using the learning image and the ground-truth region data.

9. A non-transitory, computer-readable tangible recording medium which records thereon a program for causing, when read by a computer, a processor of the computer to execute the learning method according to claim 8.

10. A trained model of the recognizer, the trained model being obtained by the learning method according to claim 8.

11. An endoscope system mounted with the trained model of the recognizer according to claim 10.

\* \* \* \* \*